(12) United States Patent
Vignisson et al.

(10) Patent No.: US 8,868,741 B2
(45) Date of Patent: Oct. 21, 2014

(54) METHOD AND APPARATUS FOR CUSTODIAL MONITORING, FILTERING, AND APPROVING OF CONTENT

(75) Inventors: Vidar Vignisson, San Diego, CA (US); Will Von Reis, Del Mar, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 199 days.

(21) Appl. No.: 12/395,610

(22) Filed: Feb. 27, 2009

(65) Prior Publication Data

US 2009/0254656 A1 Oct. 8, 2009

Related U.S. Application Data

(60) Provisional application No. 61/033,304, filed on Mar. 3, 2008.

(51) Int. Cl.
*G06F 15/173* (2006.01)
*G06F 21/60* (2013.01)
*G06F 21/55* (2013.01)
*G06F 17/30* (2006.01)
*G06F 21/62* (2013.01)
*H04L 29/06* (2006.01)

(52) U.S. Cl.
CPC ......... *G06F 21/6218* (2013.01); *H04L 63/0227* (2013.01); *G06F 2221/2101* (2013.01); *G06F 21/604* (2013.01); *G06F 21/552* (2013.01); *G06F 17/30867* (2013.01); *G06F 2221/2149* (2013.01); *G06F 2221/2137* (2013.01); *G06F 2221/2153* (2013.01); *H04L 63/102* (2013.01); *G06F 2221/2119* (2013.01)
USPC ........................................ 709/225

(58) Field of Classification Search
USPC .................. 709/217, 219, 223, 224, 225, 229
See application file for complete search history.

(56) References Cited

U.S. PATENT DOCUMENTS

| | | | | |
|---|---|---|---|---|
| 5,996,011 A * | 11/1999 | Humes | .......................... | 709/225 |
| 6,539,430 B1 * | 3/2003 | Humes | .......................... | 709/225 |
| 7,257,564 B2 * | 8/2007 | Loughmiller et al. | .......... | 706/16 |
| 7,366,761 B2 * | 4/2008 | Murray et al. | ................ | 709/206 |
| 7,653,606 B2 * | 1/2010 | Loughmiller et al. | .......... | 706/20 |
| 7,720,463 B2 * | 5/2010 | Marsico | ........................ | 455/410 |
| 7,849,143 B2 * | 12/2010 | Vuong | .......................... | 709/206 |
| 7,949,563 B2 * | 5/2011 | Collins | ....................... | 705/14.43 |
| 7,984,500 B1 * | 7/2011 | Khanna et al. | ................... | 726/22 |
| 8,046,700 B2 * | 10/2011 | Bates et al. | .................... | 715/757 |
| 8,065,173 B2 * | 11/2011 | Abu-Hakima et al. | ....... | 705/7.11 |
| 8,185,953 B2 * | 5/2012 | Rothstein et al. | ................ | 726/22 |
| 8,578,501 B1 * | 11/2013 | Ogilvie | ........................... | 726/26 |
| 2002/0095415 A1 * | 7/2002 | Walker et al. | ..................... | 707/9 |
| 2003/0140152 A1 * | 7/2003 | Creig Humes | ................ | 709/229 |

(Continued)

*Primary Examiner* — Sargon Nano
(74) *Attorney, Agent, or Firm* — Kilpatrick Townsend & Stockton LLP

(57) ABSTRACT

The system provides a way for a parent or other custodian or guardian to control content to be accessed by a child or children on a network. In one embodiment, the system logs all activity on a network by a child and sends regular historical reports to the parent for review. The parent can set certain triggers that will provide more immediate feedback when certain events occur or when certain types of data are accessed, or an attempt is made by the child for such access. The system allows the parent to control the filters and options from a variety of sources, including via the child's computer, texting, instant messaging, cell phone, other web enabled computers, and PDA's.

1 Claim, 7 Drawing Sheets

(56) References Cited

U.S. PATENT DOCUMENTS

| | | | |
|---|---|---|---|
| 2006/0041655 A1* | 2/2006 | Holloway et al. | 709/223 |
| 2006/0248144 A1* | 11/2006 | Zhu et al. | 709/205 |
| 2007/0067794 A1* | 3/2007 | Russell et al. | 725/25 |
| 2007/0073777 A1* | 3/2007 | Werwath et al. | 707/104.1 |
| 2007/0124785 A1* | 5/2007 | Marsico | 725/105 |
| 2007/0156757 A1* | 7/2007 | Tang et al. | 707/104.1 |
| 2007/0156895 A1* | 7/2007 | Vuong | 709/225 |
| 2007/0239639 A1* | 10/2007 | Loughmiller et al. | 706/20 |
| 2008/0134093 A1* | 6/2008 | Dharmarajan et al. | 715/838 |
| 2008/0195428 A1* | 8/2008 | O'Sullivan | 705/6 |
| 2008/0196108 A1* | 8/2008 | Dent et al. | 726/28 |
| 2008/0201488 A1* | 8/2008 | Kenner et al. | 709/245 |
| 2008/0222717 A1* | 9/2008 | Rothstein et al. | 726/14 |
| 2008/0250484 A1* | 10/2008 | Chong et al. | 726/7 |
| 2009/0177519 A1* | 7/2009 | Tota et al. | 705/10 |
| 2013/0268669 A1* | 10/2013 | Tessman et al. | 709/225 |

* cited by examiner

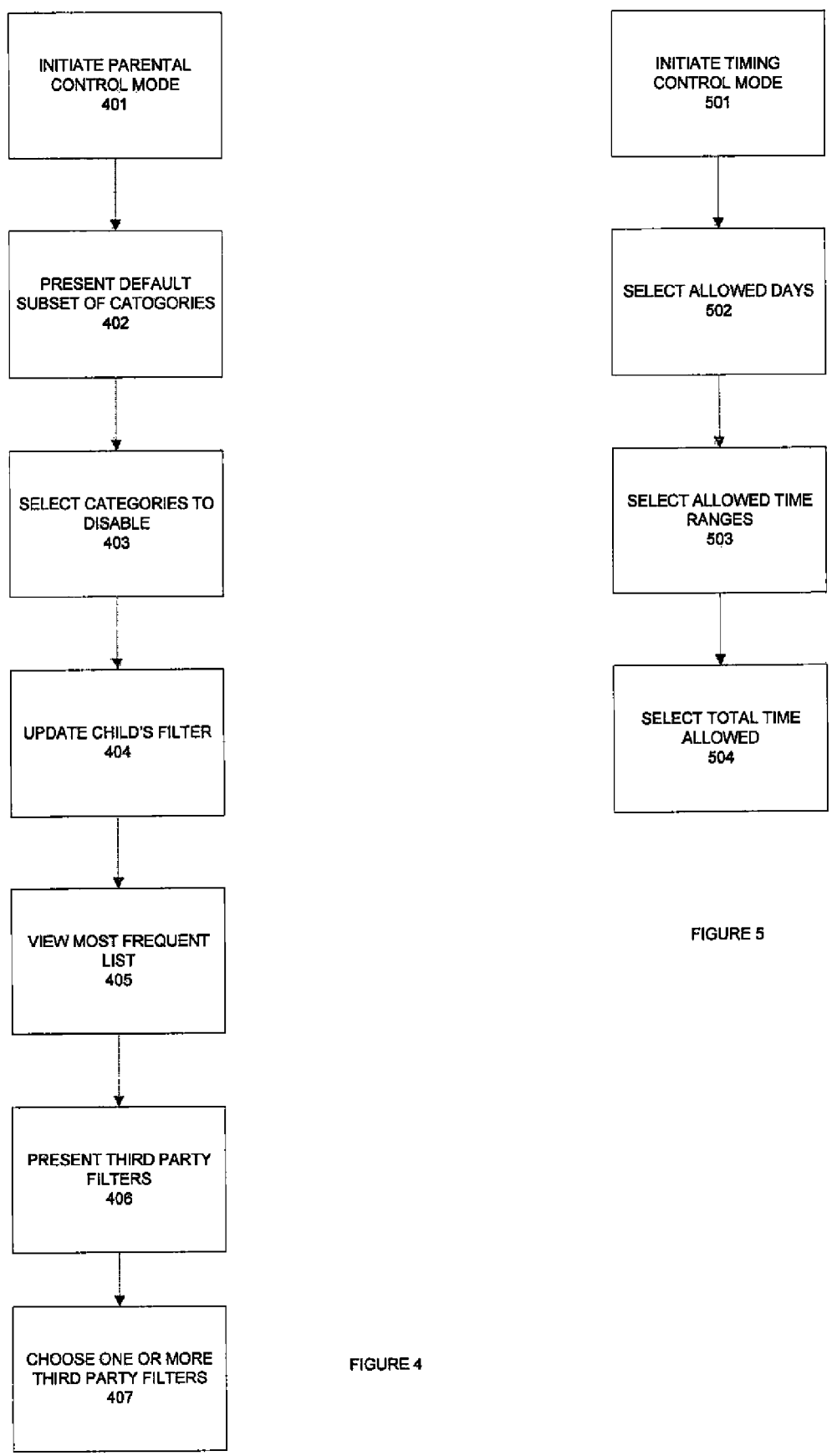

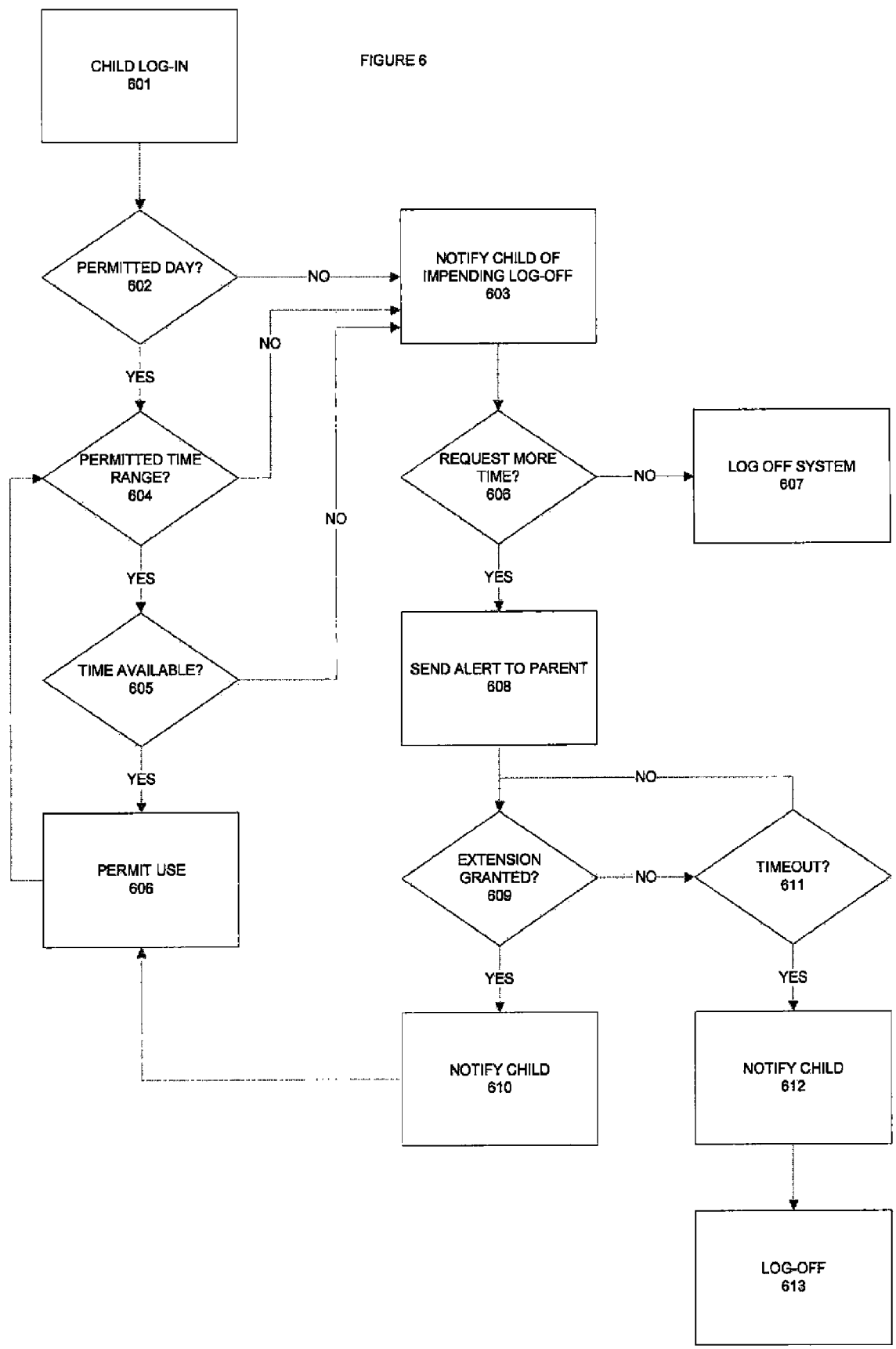

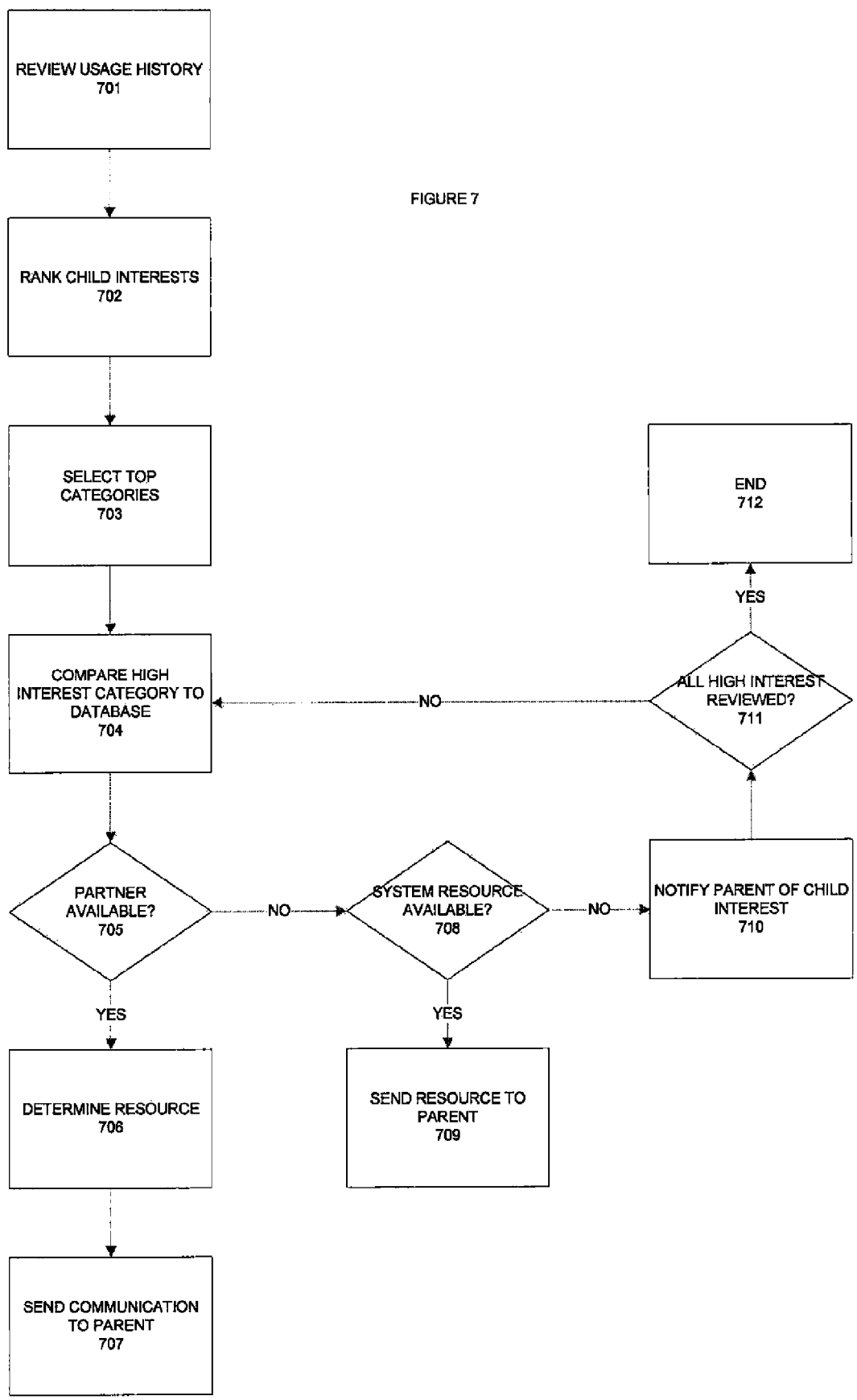

METHOD AND APPARATUS FOR CUSTODIAL MONITORING, FILTERING, AND APPROVING OF CONTENT

CROSS REFERENCE TO RELATED APPLICATIONS

This application claims the benefit of U.S. Provisional Application No. 61/033,304, filed Mar. 3, 2008, which is herein incorporated by reference in its entirety.

BACKGROUND OF THE SYSTEM

1. Field of the Invention

The invention relates to a system for the monitoring, filtering, and approving of content from one or more content sources. In particular, the system provides a method for a parent or other custodian to set limits and parameters for a child to access content on a network.

2. Background of the Invention

The ability to access information via networks such as the Internet has become an accepted part of everyday life. The ability to interact with digital knowledge sources is of such fundamental importance that parents and schools have encouraged computer literacy in children of younger and younger age. Accordingly, young children have regular and ongoing access to computers and in a typical home or school, to information networks such as the Internet.

This increased computer and Internet use by children creates a challenge for parents, who may wish to monitor or filter the information to which a child has access. Moreover, a parent may determine that a child should spend more time using a personal computing device for one thing (such as doing homework) and less time using it for other things (such as playing games). Unfortunately, a modern personal computing device typically does not provide a parent with the controls that would allow the parent to define a policy relating to how a child may use the personal computing device.

There have been some attempts to provide a children safe computing and browsing environment. In some cases, filtering software is provided that enables a parent to block certain web sites from access without a password. In theory, when the parent is surfing the web, the parent can disable the feature or supply the required password when blocked content is desired. The system may also include an ability to search for certain words and phrases and block websites that contain those phrases. The child is prevented from defeating the system due to lack of knowledge of the password.

A disadvantage of such systems is the inability to intelligently filter material. The banned websites are typically over or under-inclusive. A child may have access to potentially harmful material or may be denied access to safe and appropriate material. It also places a burden on the parents to maintain the filters and to modify them appropriately. For example, if the child is attempting to access a website that is blocked, the child needs the parent's assistance to provide permission for browsing that website.

Another disadvantage of such systems is the need for parents to rely completely on a commercial provider to determine limits for their child. In many cases, the parent may have stricter or less strict limits on what their child should be able to access.

Another disadvantage of such systems is the limited ability to change options or adapt filters to be applied to the child's network use. A disadvantage of prior art systems is the need for the parent to make changes at the machine used by the child to access the network. Due to work schedules, the parent is not always able to update options in a timely manner.

BRIEF SUMMARY OF THE SYSTEM

The system provides a method and apparatus for a parent or other custodian or guardian to monitor, filter, and approve of content to be accessed by a child or children on a network. In one embodiment, the system logs all activity on a network by a child and sends regular historical reports to the parent for review. The parent can set certain triggers that will provide more immediate feedback when certain events occur or when certain types of data are accessed, or an attempt is made by the child for such access. The system allows the parent to control the filters and options from a variety of sources, including via the child's computer, texting, instant messaging, cell phone, other web enabled computers, PDA's, etc. The system can be associated with real world tasks such as homework, chores, exercise, etc, where the completion of a task can result in permission for use, or enhanced use, of the network by the child. The system can track child usage and provide directed advertising or information to the parent related to the child's interests as evidenced by network use. The system can be highly customized with different rules for different media types, and rules related not just to viewing, but to sharing of files and media with others.

BRIEF DESCRIPTION OF THE DRAWINGS

FIG. 4 is a flow diagram illustrating the operation of a first type of filtering by a parent.

FIG. 5 is a flow diagram illustrating the setting of time and access parameters in accordance with one embodiment of the system.

FIG. 6 is a flow diagram of the timing control in operation during use of the system by the child.

FIG. 7 is a flow diagram illustrating directed communication in an embodiment of the system.

DETAILED DESCRIPTION OF THE SYSTEM

The present system provides a method and apparatus for monitoring, filtering, and approving content on a network. In the following description, the system is described in connection with an embodiment that manages content to be accessed by children on a network. However, the system is not limited to this embodiment and has application to any situation where content is desired to be managed for a specific audience. The system may be implemented in a child-oriented computer such as is described in U.S. patent application Ser. No. 12/037,082 entitled "Child-Oriented Computer System" filed on Feb. 25, 2008 and incorporated by reference herein in its entirety.

Example Embodiment

Figure 1:
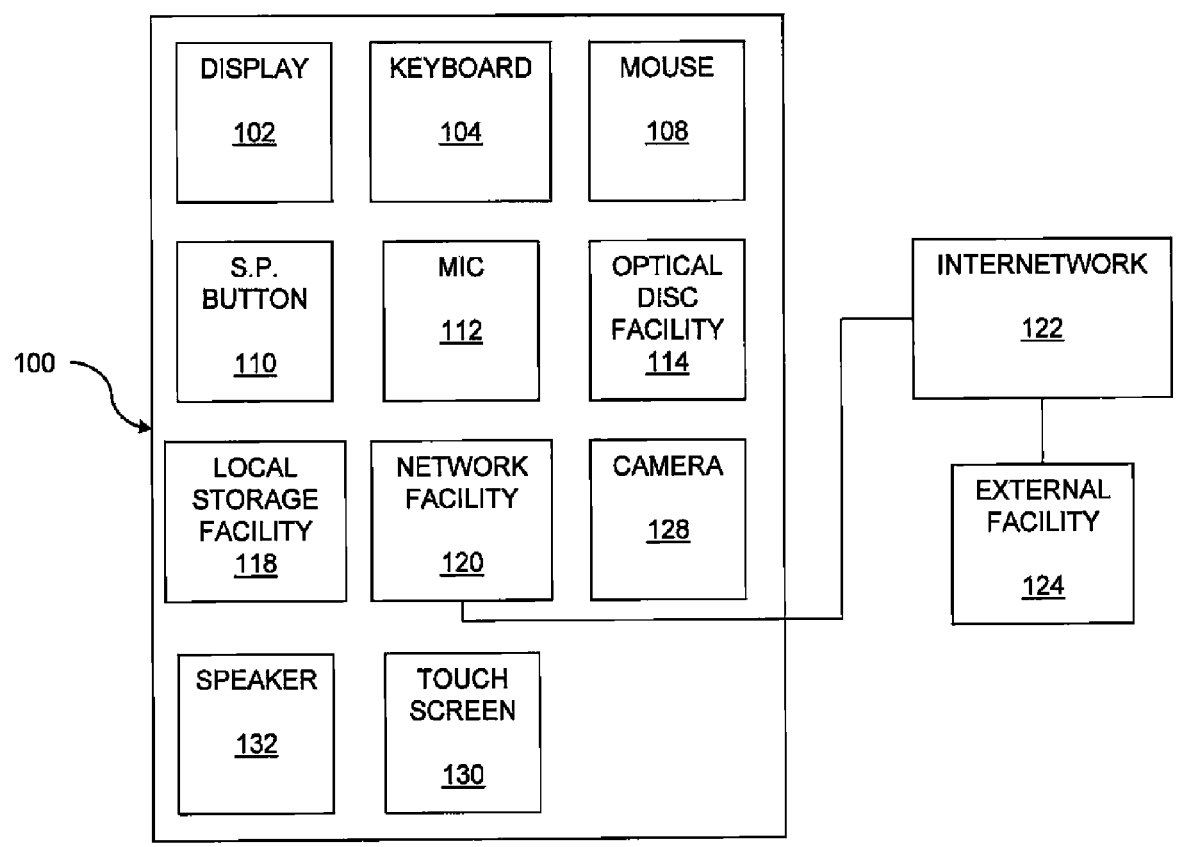
FIG. 1 is a block diagram of an example computer system in an embodiment of the system.

The system contemplates a user (in one embodiment a child) accessing a network using a computing facility of some type. Referring to FIG. 1, in some embodiments, a computing facility 100 may comprise a commercial, off-the-shelf (COTS) computing facility, such as and without limitation a personal computer (PC), a cell phone, a Sony PSP2, and the like. The COTS computing facility may run an operating system such as Linux or a variant thereof, a Microsoft Windows-brand operating system, Mac OS X, and so forth. In the preferred embodiment, the computing facility 100 may comprise a COTS PC.

In embodiments, the computing facility 100 according to the principles of the present invention may comprise the following elements: a display 102; a keyboard 104; a mouse 108; a special-purpose button 110; a microphone 112; a optical disc facility 114; a local storage facility 118; a network facility 120; a camera 128; a touch screen 130; a speaker 132; and so forth. The computing facility may be operatively coupled to a network 122, such as the Internet. The network 122 may, in turn, be operatively coupled to an external facility 124, which is described in detail hereinafter in reference to other figures.

In embodiments, the internal components of the computing facility 100 may include a primary motherboard. The motherboard may include a central processing unit (CPU); RAM memory (which may be the local storage facility 118), such as a RIMM chip, SRAM, DRAM, a BIOS chip; a PCI slot; an Accelerated Graphics Port; a ZIF socket; a disk controller, which may be directed at controlling a hard drive or floppy drive; an additional chipset; an expansion slot; a parallel port; a PS/2 port; a serial port; an ATX power connector; a fan; a battery; and so forth. The motherboard may be connected to an external power supply in order to receive power from a standard wall electrical outlet. Additional internal components may include a media drive (of which the optical disc facility 114 may be comprised) and/or ports, such as and without limitation a compact disc player/recorder, a digital video disc player/recorder, removable disk drives (e.g. a USB jump drive, memory card or the like). The internal components may connect with multimedia components, such as an audio speaker and/or the display 102 (which may comprise an LCD, plasma, CRT, LED, holographic, or other monitor or display device).

Example Software Embodiment

Figure 2:
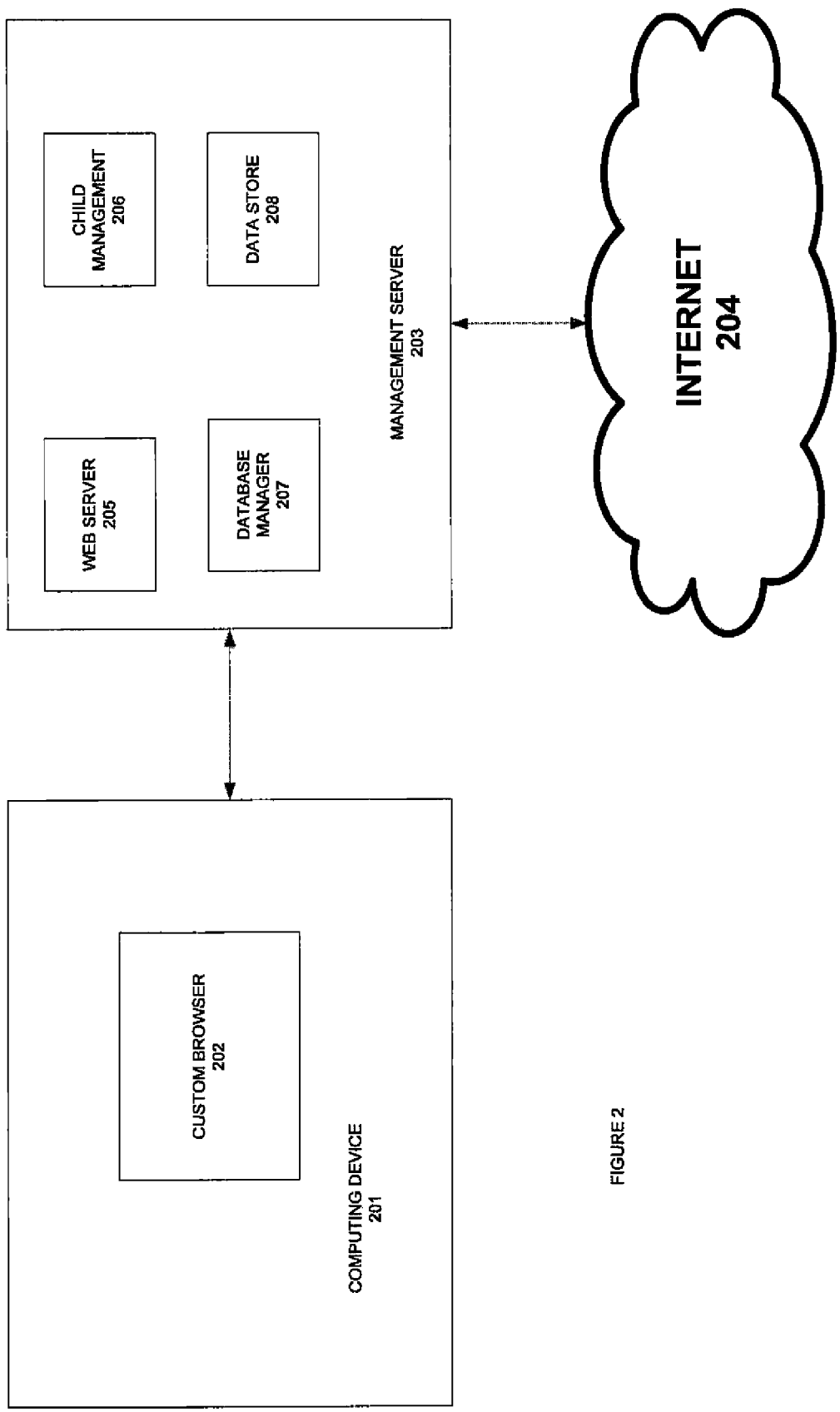
FIG. 2 is a block diagram of an example embodiment of a managed network experience.

In one embodiment the system uses a custom browser to provide the interface between the user and the Internet. The browser controls all requests and replies so that the user has a layer of protection between himself and the Internet. FIG. 2 illustrates an example implementation of a software embodiment of the child-oriented computing system. In this embodiment, the child-oriented computing system is provided by a piece of software downloaded from a management unit to a computing device wherein one or more children use the downloaded software when installed to browse content. In particular, the system may include a computer 201 that is used by the children to access the Internet. (The computer 201 may be any suitable computing device that is capable of accessing the Internet and may be the example embodiment described in FIG. 1). A typical browser (e.g. Internet Explorer, Netscape, Mozilla, etc.) is replaced with a custom browser 202 that includes browser functions such as searching, multi-media presentation, favourite lists, browsing, chatting, emailing, social networking functions, and the like and whose requests and replies are directed to and from the Internet 204 via a managing server 203. Once installed on the computing device 201, the browser application 202 controls the browsing and web surfing activities of each child that uses the computing device and logs the activities of each child so that the activities can be reviewed by a parent as described in more detail below. In another embodiment, the system is implemented as an add on to a browser, such as for a Firefox browser. In this embodiment, the system functionality is added to an existing browser instead of replacing the browser. This approach can be extended to Linux systems.

The system may further comprise a management server 203 such as one or more server computers in an exemplary embodiment that can be accessed by the computing device over a network, such as the Internet or other network. The computing device 201 may establish a session using the custom browser 202 and then interact with the management server 203 in order to at least: 1) update the browser application; 2) change parental settings; 3) review and approve particular web pages and/or categories of content; 4) download web pages containing the browsing activities and selected content for a particular child; 5) download content categories when the child is browsing using the browser application; and/or 6) provide product recommendations to a parent based on a child's browsing activities. The computing device 201 and management server 203 may also interact to perform other functions and operations as described below in more detail.

The management server 203 may further comprise its own web server 205 that serves web pages to the computing device 201 or downloads content to the browser application 202 among other functions. The management server 203 may also include a child-oriented content manager application 206 that manages one or more pieces of content that may be browsed by the browser application, and a database management unit 207 that manages the data in a data store 208 such as a database system. The data store 208 may store the data associated with the system such as the user data (child and parent data), content data, category data, web page content and the like. Data store 208 may also store a list of approved URL's, web pages, web sites, or other content that may be accessed by a user via the network.

Approved Content

In one embodiment, the system operates to limit the content to which a child has access to approved content. That is, content that has already been reviewed and deemed safe by system administrators, by an automatic approval system, by parental approval, or by some other method of approving the content. The system maintains a database of approved content that can include web pages, web sites, video, audio, photographs, graphic images, and other retrievable content. Thus, the system assumes a database of approved content that may be added to over time as new web pages, sites, and media content are created.

Initially, a database of approved content is assembled. In one embodiment, the database is defined by levels (e.g. Level 1 and Level 2). Level 1 is a review of individual media items, i.e. review of a web page, a video, a photo, or any other individual media item. Level 2 review is a review of a collection of media items, i.e. i. reviewing search results and reordering or adding items to the search results. (This is what we call categorization) or ii. reviewing a web domain, evaluating all the pages belonging to a domain, such as nick.com and determining whether every page in the domain should be approved or rejected. Level 2 is generated by incorporating websites from child friendly content sources (e.g. DMOZ, kids directories, Nickelodeon, Disney, etc.). Next, a category list is defined of the categories that are most relevant for children (entertainment, education, etc.). The category list is then populated with the collected content. In one embodiment, the categories were either populated with what was considered the best content or were populated with a ranking, ordering, or weight for each content source. In one embodiment, an editor selects a category (Zebra for example) and the system algorithmically finds the websites believed to be related to the category of such content based on the search algorithm. At the same time, the system fetches photos and other media content from the creative commons library at FlickR that were tagged with this category and pull videos from sites such as YouTube that met this category key word. The editor would then review the list of websites, photos and videos and pick the most relevant ones to populate a top level of results (e.g. 48 websites, 18 videos and 18 photos). The editor will also rank or order the content so that the most relevant appear in the top positions of a search for that category. The system may perform spidering in the same manner as current search engines.

The system then looks at the individual pages, sites, videos, sound files, photos, images, etc. and approves them on a one-by-one basis. This is the Level 1 category. This is for the content that was not considered to be the top level in the Level 2 exercise above. At this stage, the system may also assign category tags to the content or may rely on the Level 2 categorization. The Level 1 category also includes blocked content that results from a request for unapproved content.

Initially a database of approved content is assembled.

i. from spidering and feeding the results of the spidering to editors for review (i.e. Level 1 review)

ii. from editors searching using commercial search engine or web site search capabilities for individual sites and adding individual items to the database of content iii. from editors leaning of other interesting online media items (from word of mouth, TV, magazines, newspapers, etc.) and adding them individually to the database of content iv. When kids encounter pages through the KidZui browser that have not been reviewed they are sent to editors for review.

v. The system periodically re-spiders web sites and tries to determine if they have changed sufficiently to require a re-review by editors. If it determines that a re-review is required, the webpage is placed in the editorial queue for review vi. The client reports problems playing videos that do not get played to the back-end server system and those videos get placed in the editorial queue vii. The client reports pages that do not get loaded, i.e. 404s, 500s etc., and those pages are also placed in the editorial queue Category lists are defined i. editors examine popular search terms and create categories based on them. These are used in search auto-completion ii. editors examine the search results for categories and if they deem them not sufficiently strong, they adjust order of results and the search for additional content to add to the database of approved content to improve the search results iii. The system examines popular categories and search terms and regularly spiders content from those sources The above is one example of how to build a database of approved content. However, any other suitable method may be utilized without departing from the scope and spirit of the system.

The system assumes a default content rating method that is deemed acceptable for all children. In one embodiment, the system assembles and adds content that is deemed safe for all children from the ages of three to eleven for example. However, parents may desire a stricter definition of acceptable safe content for their child. In other cases, the parent may wish to time limit access to all or some content, or to make the availability of all or some content conditional on some events or triggers. A parent may also wish to be notified of activity of the child on the network. The system provides a way to accomplish this goal. In addition, the system provides categories of content that parents may want to turn on or turn off for their child. For example, parents may want to turn off content related to reproduction.

Parental Controls

In one or more embodiments, the methods and systems may be provided with parental controls, such as controls that control the content that children can access (whether on television, websites, games, or the like), controls that restrict when children can access what content, and controls based on events (such as allowing access to games or television when homework is complete). Controls can be exercised by and/or shared with others, such as teachers, tutors, caregivers, or the like.

Methods and systems disclosed herein can include a service that allows parents to modify controls through, for example, a remote network interface, such as a Web interface. Through the network interface parents can help children keep schedules, such as waking them up, letting them know how to dress (such as based on the weather as determined through the web), sending timed messages about homework, sending photographs or video, or the like. In one embodiment, the parental controls may provide control over the time when the applications on the computing system are available to the child. For example, a parent may set the controls to allow the child to watch television, video, or a DVD between certain hours in the day, while other activities such as word processing, spreadsheet software and the like may be offered during other periods including overlapping periods. The following is an example of the capabilities parents have for each child account or all child accounts collectively:

Set the amount of time spent doing the following:
   Using the system
   Watching television and recorded programs.
   Playing games
   Surfing the Internet
   Watching Videos
   Watching DVDs
   Playing Music
   Communicating with others on the Internet.
   Using specified software programs
   Playing an external gaming console where the system is the monitor Set a schedule for when the following is permissible:
   Using the system
   Watching television and recorded programs.
   Playing games
   Surfing the Internet
   Watching Videos
   Watching DVDs
   Playing Music
   Communicating with others on the Internet
   Playing an external gaming console where the system is the monitor
   Using specified software programs
   Add/Remove television channels from the list of approved television channels
   Add/Remove television shows from the list of approved television shows
   Add/Remove web sites from the list of web sites approved for web surfing
   Add/Remove email addresses from the list of approved email addresses
   Add/Remove instant messaging addresses from the list of approved instant messaging addresses Add/Remove video conferencing addresses from the list of approved video conferencing addresses. (We may provide a web cam video conferencing capability to communicate with parents/grandparents, etc.)

Add/Remove phone numbers from the list of approved phone numbers. (We may provide a voice over IP phone service to approved numbers, i.e. grandparents/parents etc.)

Specify a content rating indicating what level rating is appropriate.

Add/Remove from the list of system friends who their children can share photos, videos and other documents with.

Add/Remove software that is available on the system. This can involve a purchase by the parent or just a selection of software from the list of free titles provided by the system network.

Add/Remove $3^{rd}$ party content on the system. This can be in the form of music, movies, interactive flash movies, etc. that are either available free from the system network or for a charge.

Parental Filtering

Categories

As noted above, the system has defined a number of categories, (e.g. approximately 5000) that are of interest to children. A first level of filtering that is available to parents is to choose to disable certain categories for their child. When a category is disabled, any content that has been identified as being part of that category will be considered unapproved for that child, even though it may be approved for the system overall. In one embodiment the system offers to the parent a subset of all the categories that are potentially categories to be disabled. This eliminates the need for the parent to scroll through thousands of categories to determine which to disable. This subset may consist of 10-50 categories that are believed to be the most likely that a parent may block.

In another embodiment, the system collects disabled categories from all parents and can present the most frequently disabled categories based on age, gender, geography, or any other suitable metric. In one embodiment, the system includes category association data for each blocked and unapproved content request made by the child. The system can identify to the parent when categories have already been disabled by the parent as well as any additional categories that have not been disabled. In this manner the parent can be made aware of risky categories that the parent may want to disable.

If desired, the parent has access to a list of all categories so that complete customized filtering can be implemented by the parent.

FIG. 4 is a flow diagram illustrating the operation of this first type of filtering by a parent. At step 401 the parent enters the parental control mode. At step 402 the parent is presented with the default subset of categories to disable. At step 403 the parent goes through the list and selects those categories to disable. At step 404 the system updates the child's filter to prevent any content associated with those categories from being presented to the child.

At optional step 405 the parent can choose to view the most frequently disabled categories. This selection can be made with no metrics, by age, gender, and/or geography.

At optional step 406 the system can ask the parent to select from a third party filter. The system contemplates the ability for third parties to define filters and categories for disabling based on certain parameters. These third parties can be other parents known to the parent, children's organizations that have generated a filter based on their own philosophy, or by a school, government, or other group. The parent can elect at optional step 407 to choose one or more of these pre-defined filters and use it to filter content for their child. The settings are live in that when the organization or friend changes their settings, the changes are reflected for the parent as well. Parents can also elect to have the settings static, so they just get a snapshot of the settings at the time when they selected them.

The system server system enables organizations that want to maintain a set of configurations to do so via a browser based interface. When the organization updates its setting, the settings are saved by the system server system. This triggers the server system to notify currently connected system to update their parental control settings. A system that is not currently connected will update its setting the next time it connects to the system server system.

Specific Content

In addition to filtering categories, the parent can also filter specific content sources. Parents can elect to have individual web sites filtered via white list (i.e. a list of sites that are approved) or a black list (i.e. a list of sites that are not approved). As noted above with respect to categories, the parent can also elect to use settings that have been created by an organization that they trust (i.e. a school, a church, etc.) or a friend or other trusted individual who is willing to share settings with them or based on community ratings of web sites by other parents belonging to the custom browser network.

The list of sites that is approved or denied is maintained by the management server system. The site list is communicated to custom browser any time a modification is made to the list or a user signs on to a custom browser, without having an up to date list present.

The parent can define these filters at any time and from any of a plurality of environments. For example, the parent can implement these filters at the child's computer, via the internet at the parent's or some other computer, via cell phone, SMS text messaging, via email instruction, or any other communication method.

Blocked Request Operation

Figure 3:
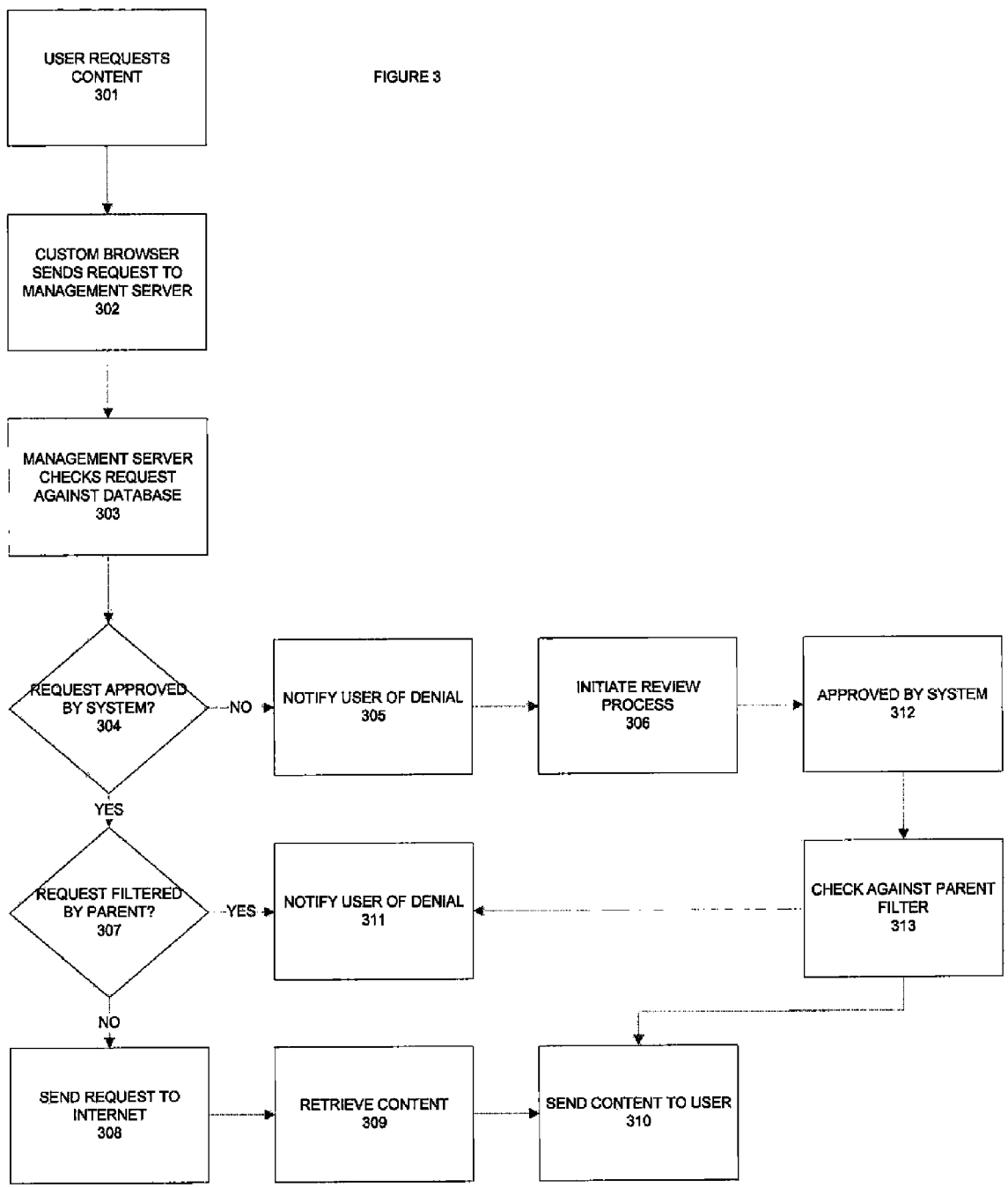
FIG. 3 is a flow diagram illustrating the handling of a content request in an embodiment of the system.

FIG. 3 illustrates the operation of the system after the parent has defined unapproved categories or sites. At step 301 the user requests content (e.g. a web site or web page) and transmits the request from the user's computer 201. At step 302 the request is received by the management server 203. At step 303 the management server 203 checks the requested URL against a list of approved URL's in the data store 208. At decision block 304 it is determined if the URL is approved.

If the request is approved at step 304, the system next checks at decision block 307 to see if the request is one that should be blocked based on the parent filter for this child. If so, the child is notified of the denial at step 311. If the request passes both the system filter at step 304 and the parent filter at step 307, the system sends the request to the internet at step 308, the content is retrieved at step 309, and the content is sent to the user at step 310.

If the URL is not approved at step 304, the system notifies the user at step 305 that the URL is not approved. The system then initiates an editing and review operation at step 306. If the request is approved by the system at step 312, the approved request is then checked against the parent filter at step 313. If the request is approved by the system but not the parent filter, then the system proceeds to step 311 and notifies the user that the request is denied. If the parent filter is passed at step 313; the system proceeds to step 310 and sends the content to the user.

Timing Controls

In addition to controlling access to categories and specific content, a parent can control the time of day and length of time the child can participate on the system. A parent control panel is available to the parent and includes the ability to select from one or more child accounts associated with or under the control of the parent. The control panel allows the parent to set access parameters. As noted above, the system permits the parent to control not just general access to the system, but access and timing for specific applications as well. For example, the parent can limit access to entertainment content and features during times the child is expected to be using the system for homework assistance.

FIG. 5 is a flow diagram illustrating the setting of time and access parameters in accordance with one embodiment of the system. At step 501 the parent initiates the parental timing control mode. This may be accomplished by logging into a web site, entering user name and password information, and selecting the child account for which the parameters are to apply. At step 502 the user selects days on which the child is permitted to access the system. In some cases, a parent may wish to limit access to weekends or certain days of the week. If desired, the parent can permit daily access to the system.

At step 503 the parent is prompted to select time ranges during which it is permissible for the child to log in. For example, the parent may not wish for the child to log-in during morning hours or immediately after school. At this control panel, the parent can select multiple time ranges on each day, including different time ranges on each day. When the child attempts to log on to the system outside of these ranges, access is denied. In one optional embodiment, any attempt to log on outside the permitted time range triggers an alert to the parent using the communication method selected by the parent (email, cell phone, SMS test messaging, IM, etc.). The parent can then grant permission or denial from the same device.

If the child is currently logged onto the system during a permitted time, but the end of a permitted time range is about to occur, the child is notified to prepare to be logged off. Again, the system could send an alert to the parent so the parent can decide to permit continued use beyond the time range if desired.

AT step 504 the parent can set a total time period per day and/or per week of child usage. This can be a total number of hours per day and a total number of hours per week. When the total time limit is approaching, the child is notified and an alert is sent to the parent to enable waiving of the limit if desired. In the absence of permission from the parent. The system automatically logs the child off when the limit is reached.

FIG. 6 is a flow diagram of the timing control in operation during use of the system by the child. At step 601 the child initiates the log in process. At step 602 the system checks to see if the day is a permitted day.

If so, the system proceeds to check at step 604 if the current time is within a permitted time range. If so, the system proceeds to step 605 At step 605 the system checks to see if time is available under the total permitted use for the relevant time period (day or week). If so, the system logs the child in at step 606 and returns to monitoring time range at step 604 and total usage at step 605.

If any of the parameters at steps 602, 604, and 605 are not satisfied (e.g. wrong day, out of date range, or total time limit exceeded), the system notifies the child of impending log off at step 603. At step 606 the system asks the child if the child would like to request permission to waive the limit. If not, the system logs out at step 607. If the child is asking for permission, an alert is sent at step 608 to the parent notifying the parent of impending log off and that the child is requesting additional time. At step 609 the system checks to see if the parent has granted permission. If so, the system notifies the child at step 610 and the system continues. In granting the permission, the parent may indicate a new time period for extension, such as half hour, one hour, etc. If the parent has granted an extension based on the triggering of one of the limits, then that extension will control over the expiration of any of the other limits.

If the parent has not granted an extension or if a predetermined waiting period (e.g. five minutes) has passed at step 611, the child is notified at step 612 that log off will occur in some time period (e.g. five minutes) and the system shuts down at step 613.

Media/Sharing Filter

In addition to the filtering of categories, web sites, and timing control, the system also permits parents to establish rules for sharing of media and other content. Parents can use system default filters for controlling access to media via sharing methods such as email, IM, SMS, etc. The parent can also adopt third party control schemes or generate their own control scheme. The controls may be age based, category based, site based, etc. If desired, the parent can have a blanket control or limitation on types of media such as preventing any media clips at all. The parent can also use different filtering rules for each child in a multi-child environment. It may be that younger children are blocked from certain types of media or from certain categories of media.

Remote Parental Controls

An advantage of the system is the ability to control parameters from a variety of devices remote from the actual child's computer itself, along with simplified control commands. Events that require approval or disapproval from parents can be accomplished in one click through a system parental account and/or from an email notification.

Parents can also provide the approval by sending an SMS message to the system network US Short code. Approval requests are triggered on events such as receipt of emails or instant messaging invites from users that are currently not authorized to engage in email conversations with the intended system recipient.

Parents can initiate a change to the settings of the system from a web site, a web enabled phone, an SMS enabled phone, via network enabled client software or another network enabled device. As soon as the parent initiates a change to the system, the change event is communicated to the system Network server systems, which maintain an open connection to each system. The system Network server systems then communicate without delay the change to the system via the open connection.

Parents can make most changes via the US short code and they can also be performed as a reply to a request generated from the system. In this situation the parents receive an SMS message to their phone that they then reply to with an approval or a rejection. Some of these messages may be premium SMS messages. In this situation parents can actually purchase items, such as a movie for rental.

Parental Reporting

One of the advantages of the system is complete and customizable reporting. The format and nature of the report can be customized by the parent. In addition, the destination of the report can be one or more locations designated by the parent. Further, the nature of the reporting can be time and/or event based. Each child is the owner of his or her own account on the system. All history information for that user (login/logoff time, searches, sites visited, content downloaded, etc) is collected for each child. The system server system performs analysis and presents the data through the parental control interface to parents.

The system provides at least the following information to parents via reporting: A comprehensive list of all events performed on the system, including their start end and duration a long with totals. A comprehensive list of all communication to and from the system. A comprehensive list of web sites visited.

The parent can elect to have the report sent to the parent's email account. The system can also send the report to cell phones, PDA's, via SMS text messaging, via Instant Messaging, or any other suitable communication method. The system can also send alerts based on triggers that the parent can define. For example, as described below, there may be times when a child requests content from a page or site that is not resident on the approved content list (a blocked page). The parent may wish to be notified each time the child requests a blocked page. Sometimes these pages are later approved for viewing. A blocked page does not by definition mean that the content is objectionable, it just means it had not yet been approved. The parent may wish to be notified only when the child requests a blocked page that was later found to be un-approved. In other instances, the parent may only wish to be notified when a child requests a certain number of blocked pages, a certain number in a session or in a certain time period (e.g. every five blocked pages or if there are five or more blocked pages in a single session or per hour). The system permits the parent to define the parameters of the monitoring and filtering.

Directed Communication

In one embodiment, the system uses the reporting capability to tailor communications to the parent based on the activity of the child. For example, if the child is interested in dinosaurs, the parents may be presented with communications notifying them of their child's interest (based on usage history) along with a listing of resources related to that interest. The resources could be commercial in nature, such as models, figurines, books, films, etc. relating to dinosaurs. The resources could be educational in nature so that the child could learn more about the subject. The resources could also be information about other resources on the network that are geared to that subject. In one embodiment, the communication could include the offer of network tools and resources (e.g. "skins" for the child's home page, software widgets related to dinosaurs, etc.) that can be purchased or earned by the child.

FIG. 7 is a flow diagram illustrating the operation of this system. At step 701 the usage history of the child is reviewed by the system. At step 702 the system ranks the interests of the child. This can be done by a combination of factors. Since each site and content source has associated categories, the categories themselves can be ranked based on frequency of visits, length of time visited, repeat visits, adding to favourites list, historical trends, or other metrics. After the categories of interest of the child have been identified, the system ranks a certain number of the highest level of interest (e.g. top five) at step 703. The system then compares each of the high interest categories to a database of resources at step 704.

At step 705 it is determined if there are commercial partners associated with the high interest category. If so, at step 706 the resource offered by the commercial partner is determined and a communication is prepared and sent to the parent of the child at step 707. If not, at step 708 it is determined if there are system based resources that are associated with the high interest category. If so, the resources are identified in a communication sent to the parent at step 709.

If not, the system prepares a report at step 710 that notifies the parent of their child's high interest in this category. At step 711, the system checks to see if all high interest categories have been reviewed. If so, the system ends at step 712. If not, the system returns to step 704 and selects the next high interest category.

In another embodiment, the system can periodically poll the child about interest in learning more about areas of interest during a browsing session. For each positive response the child gives, the system can generate a communication to the parent indicating the child's interest and including offers of resources available to the child and parents.

Real World/Virtual World Coordination

One feature of the system allows the parents to set controls that will control access on conditional factors that occur in the physical world. For example, the system can be configured to prevent or limit access until homework assignments are accomplished. If the child presents completed homework to the parent, and the parent is satisfied with the work, the parent can then check off the activity on the parent's control panel and this will result in access to the system. The feature can be thought of as a system of "credits" and "points" that can be earned by the child. A credit applies to time or access on the system while a point is more like a virtual currency that can be redeemed for purchasable items such as CDs, DVDs, software, etc.

Credits are linked to behavior such as chores, grades and other activities. The system has the ability to track children's chores, grades, and other functions that are tagged as good and convert them into credits.

In one embodiment, Children can redeem credits to perform activities such as games or watch television. Parents have the ability to determine what the worth of the credits is, i.e. how many credits their children need to earn in order to perform a credit based activity.

Parents can elect to have the children enter their own checks for behaviors external to the computer, such as cleaning their room or the parents can enter that type of information, if they want to take advantage of this feature. In another embodiment, the parents must sign off on the completion of the conditional element.

System credits can also be tied to system points. System credits can also be tied to parental settings, so that a child could redeem system credits for additional television viewing time or they can increase other limits set by parents, based on the parents' desire.

System points enable purchase of physical world items, such as toys or digital assets such as downloaded movies. The system provides automated fulfillment of assets bought with system points. Parents can purchase points for their children and some system points may be included with the system network.

Figure 8:
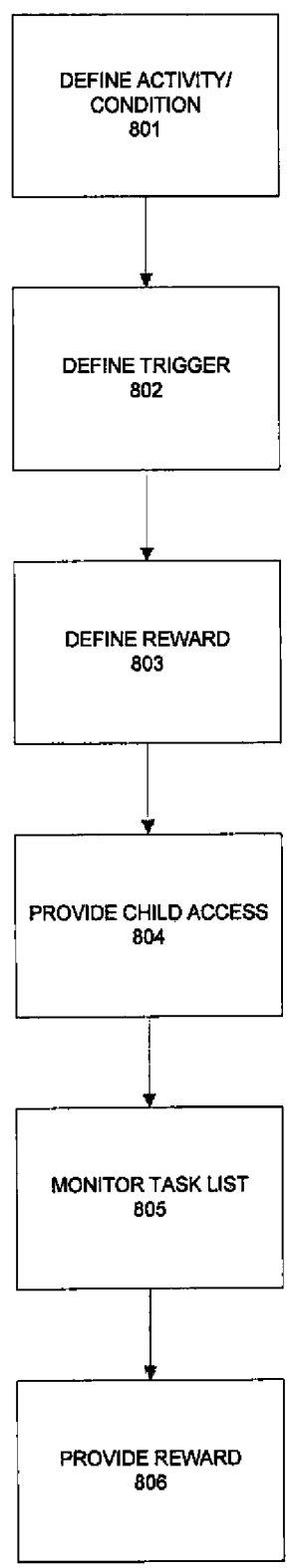
FIG. 8 is a flow diagram illustrating the operation of the credit/point reward feature of the system.

FIG. 8 is a flow diagram illustrating the operation of the credit/point feature of the system. At step 801 the parent uses the system to define an activity or condition to be accomplished by the child. This may be a chore, homework, the achievement of a certain grade in school, etc. The system allows the parent to define one time activities or recurring activities. At step 802 the parent defines the trigger that will indicate completion of the activity or satisfaction of the condition. This may be a sign-off by the parent or it may be an honor system where the child is trusted to be honest in reporting the completion of the activity.

At step 803 the parent defines the reward that is to be associated with the completion of the activity. This may be credits and/or points. The credits may be for extra time on the system, for access to certain media types or files, for widgets and customizing software that is earned. At step 804 the system adds the new activity to a piece of presentation software that can be accessed by the child. This can be in the form of a to-do list, chore list, reward list, or some other presentation interface that reminds the child of the task and the reward.

At step 805 the system monitors the task list to determine if the completion trigger has occurred. If so, the system provides the reward at step 806.

Thus, a method and apparatus for monitoring, filtering, and approving of content has been described.

What is claimed is:

1. A method for responding to a request for content on a network comprising:
   initiating a request from a user for content from an unauthorized web page that was not previously approved on a computing device;
   transmitting the request to a management server to initiate a review process;
   comparing the request to a system database of approved requests and system approving the request when the request is in the system database of approved requests;
   then comparing the system approved request to a parental filter;
   banning the system approved request when the system approved request is in the parental filter of banned requests;
   granting the system approved request when the system approved request is not banned by the parental filter and transmitting the content to the user in response to the request.

* * * * *